(12) United States Patent
Nagamitsu et al.

(10) Patent No.: US 11,736,577 B2
(45) Date of Patent: Aug. 22, 2023

(54) SERVER, UPDATE MANAGEMENT METHOD, NON-TRANSITORY STORAGE MEDIUM, SOFTWARE UPDATE DEVICE, AND SYSTEM INCLUDING SERVER AND SOFTWARE UPDATE DEVICE

(71) Applicant: TOYOTA JIDOSHA KABUSHIKI KAISHA, Toyota (JP)

(72) Inventors: Shoichi Nagamitsu, Miyoshi (JP); Jun Hamasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 5 days.

(21) Appl. No.: 17/347,991

(22) Filed: Jun. 15, 2021

(65) Prior Publication Data

US 2022/0021750 A1 Jan. 20, 2022

(30) Foreign Application Priority Data

Jul. 20, 2020 (JP) .................................. 2020-123928

(51) Int. Cl.
| | |
|---|---|
| *H04L 67/00* | (2022.01) |
| *G06F 8/65* | (2018.01) |
| *H04L 67/12* | (2022.01) |
| *H04L 67/55* | (2022.01) |
| *H04L 67/60* | (2022.01) |

(52) U.S. Cl.
CPC .............. *H04L 67/34* (2013.01); *G06F 8/65* (2013.01); *H04L 67/12* (2013.01); *H04L 67/55* (2022.05); *H04L 67/60* (2022.05)

(58) Field of Classification Search
CPC ......... H04L 67/34; H04L 67/12; H04L 67/55; H04L 67/60; G06F 8/65; G06F 8/71; H04W 4/44; H04W 76/16
See application file for complete search history.

(56) References Cited

U.S. PATENT DOCUMENTS

| | | | |
|---|---|---|---|
| 10,554,815 B2* | 2/2020 | Parker | H04M 1/27475 |
| 11,271,971 B1* | 3/2022 | Khan | H04W 4/44 |
| 2009/0125985 A1* | 5/2009 | Traenkenschuh | G06F 21/51 |
| | | | 726/4 |

(Continued)

FOREIGN PATENT DOCUMENTS

| | | |
|---|---|---|
| JP | 2018-181377 A | 11/2018 |
| JP | 2020-023314 A | 2/2020 |
| JP | 2020-030607 A | 2/2020 |

*Primary Examiner* — Brian J. Gillis
*Assistant Examiner* — Thao D Duong
(74) *Attorney, Agent, or Firm* — Oliff PLC

(57) ABSTRACT

A server includes one or more processors configured to: perform bidirectional communication with the software update device using a first communication method; transmit information to the software update device using a second communication method different from the first communication method; and determine whether the one or more processors have received a specific request from the software update device using the first communication method, wherein the one or more processors are configured to provide a notification to the software update device using the second communication method when determining that the one or more processors have not received the specific request from the software update device.

11 Claims, 7 Drawing Sheets

(56) References Cited

U.S. PATENT DOCUMENTS

| | | | |
|---|---|---|---|
| 2015/0113520 A1* | 4/2015 | Kotani | G06F 8/654 |
| | | | 717/172 |
| 2017/0060559 A1* | 3/2017 | Ye | G06F 8/65 |
| 2017/0206034 A1* | 7/2017 | Fetik | G06F 3/0604 |
| 2018/0225892 A1* | 8/2018 | Miura | G01S 11/06 |
| 2019/0068818 A1* | 2/2019 | Yabe | G06F 3/1232 |
| 2020/0057628 A1* | 2/2020 | Sano | B60R 16/0231 |
| 2020/0057872 A1* | 2/2020 | Ingraham | H04L 9/085 |
| 2020/0065087 A1* | 2/2020 | Miura | H04L 67/34 |
| 2020/0092789 A1* | 3/2020 | Lee | H04W 8/005 |
| 2020/0300640 A1* | 9/2020 | Hong | G01C 21/3889 |
| 2021/0141631 A1 | 5/2021 | Harata et al. | |
| 2021/0182087 A1* | 6/2021 | Park | G06F 3/0481 |

\* cited by examiner

| VEHICLE ID | VALIDITY INFORMATION | PREVIOUS UPDATE DATE AND TIME | ECU1 | ECU2 | ECU3 | ECU4 | ... |
|---|---|---|---|---|---|---|---|
| VID_1001 | VALID | xxxx | 1.2 | 2.1 | 1.4 | 1.0 | |
| VID_1002 | VALID | yyyy | 1.2 | 2.1 | 1.4 | 1.0 | |
| VID_1003 | INVALID | – | 2.0 | 3.0 | 1.4 | 1.0 | |
| VID_2004 | VALID | zzzz | 1.5 | 2.1 | – | 1.0 | |
| VID_2005 | INVALID | – | 1.5 | 2.1 | – | – | |
| | | | | | | | |

SERVER, UPDATE MANAGEMENT METHOD, NON-TRANSITORY STORAGE MEDIUM, SOFTWARE UPDATE DEVICE, AND SYSTEM INCLUDING SERVER AND SOFTWARE UPDATE DEVICE

CROSS-REFERENCE TO RELATED APPLICATION

This application claims priority to Japanese Patent Application No. 2020-123928 filed on Jul. 20, 2020, incorporated herein by reference in its entirety.

BACKGROUND

1. Technical Field

The present disclosure relates to a server, an update management method, a non-transitory storage medium, a software update device, and a system including a server and a software update device.

2. Description of Related Art

A vehicle is equipped with a plurality of electronic control units (ECUs) for controlling operation of the vehicle. The ECU includes a processor, a temporary storage unit such as a random access memory (RAM), and a non-volatile storage unit such as a flash read-only memory (ROM). The processor executes software stored in the non-volatile storage unit to realize the control function of the ECU. The software stored in each ECU is rewritable, and by updating the software to a newer version, it is possible to improve the function of each ECU or add a new vehicle control function.

As an example for a technology for updating the software of the ECU is an over-the-air (OTA) technology in which a communication module connected to the in-vehicle network is wirelessly connected to a communication network such as the Internet, software is downloaded from the server to the vehicle via wireless communication, and the downloaded software is installed, thereby updating or adding software of the ECU.

The program update by OTA can be started when the power supply or ignition of the vehicle is turned on and the update control device mounted on the vehicle transmits the version information of the program of the in-vehicle device to the server (for example, see Japanese Unexamined Patent Application Publication No. 2018-181377 (JP 2018-181377 A)).

SUMMARY

When the vehicle is in an environment where the communication module cannot communicate with the server due to radio wave conditions or the like, the vehicle cannot transmit a software update confirmation to the server even when the power supply or ignition is turned on. Further, in the case of a vehicle for which software update by OTA is not registered in the server in advance and OTA is not validated in the server, a communication link cannot be established between the communication module and the server.

If the state in which the communication module and the server cannot communicate with each other continues, the software of the ECU may not be updated for a long period of time, and there is room for improvement in the management of the software update of the ECU.

The present disclosure provides a server, an update management method, a non-transitory storage medium, a software update device, and a system including a server and a software update device that allow transmission of a notification about software update to the vehicle side even when information cannot be transmitted from an electronic control unit to the server.

A server according to a first aspect of the present disclosure is configured to communicate with a software update device that is configured to control software update of an electronic control unit mounted on a vehicle. The server includes one or more processors configured to: perform bidirectional communication with the software update device using a first communication method; transmit information to the software update device using a second communication method different from the first communication method; and determine whether the one or more processors have received a specific request from the software update device using the first communication method. The one or more processors are configured to provide a notification to the software update device using the second communication method when determining that the one or more processors have not received the specific request from the software update device.

An update management method according to a second aspect of the present disclosure is executed by a computer including a processor, a memory, and a storage device. The computer is configured to perform bidirectional communication with a software update device that controls software update of an electronic control unit mounted on a vehicle using a first communication method, and transmit information to the software update device using a second communication method different from the first communication method. The update management method includes: determining whether a specific request has been received from the software update device using the first communication method; and providing a notification to the software update device using the second communication method, when the computer determines that the specific request has not been received from the software update device.

A non-transitory storage medium according to a third aspect of the present disclosure stores an update management program that is executable by a processor of a computer and that causes the processor to perform functions. The computer including the processor, a memory, and the non-transitory storage medium. The computer is configured to perform bidirectional communication with a software update device that controls software update of an electronic control unit using a first communication method, and transmit information to the software update device using a second communication method different from the first communication method. The functions includes: determining whether a specific request has been received from the software update device using the first communication method; and providing a notification to the software update device using the second communication method, when the computer determines that the specific request has not been received from the software update device.

A software update device according to a fourth aspect of the present disclosure is configured to control software update of an electronic control unit mounted on a vehicle. The software update device includes one or more processors configured to: perform bidirectional communication with a server using a first communication method; receive information from the server using a second communication method different from the first communication method; and determine whether the one or more processors have received a notification from the server using the second communication method. The one or more processors are configured, when determining that the one or more processors have received the notification from the server, to cause an output device to output information related to the notification that is received.

A system according to a fifth aspect of the present disclosure includes a server; and a software update device configured to control software update of an electronic control unit mounted on a vehicle. The server includes one or more first processors configured to perform bidirectional communication with the software update device using a first communication method, transmit information to the software update device using a second communication method different from the first communication method, and determine whether the one or more first processors have received a specific request from the software update device using the first communication method. The software update device includes one or more second processors configured to perform bidirectional communication with the server using the first communication method, receive information from the server using the second communication method, and determine whether the one or more second processors have received a notification from the server. The one or more first processors are configured to provide a notification to the software update device using the second communication method when determining that the one or more first processors have not received the specific request from the software update device using the second communication method. The one or more second processors are configured, when determining that the one or more second processors have received the notification from the server, to cause an output device to output information related to the notification that is received.

The present disclosure can provide a server, an update management method, a non-transitory storage medium, a software update device, and a system including a server and a software update device that allow transmission of a notification about software update to the vehicle side even when information cannot be transmitted from an electronic control unit to the server.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
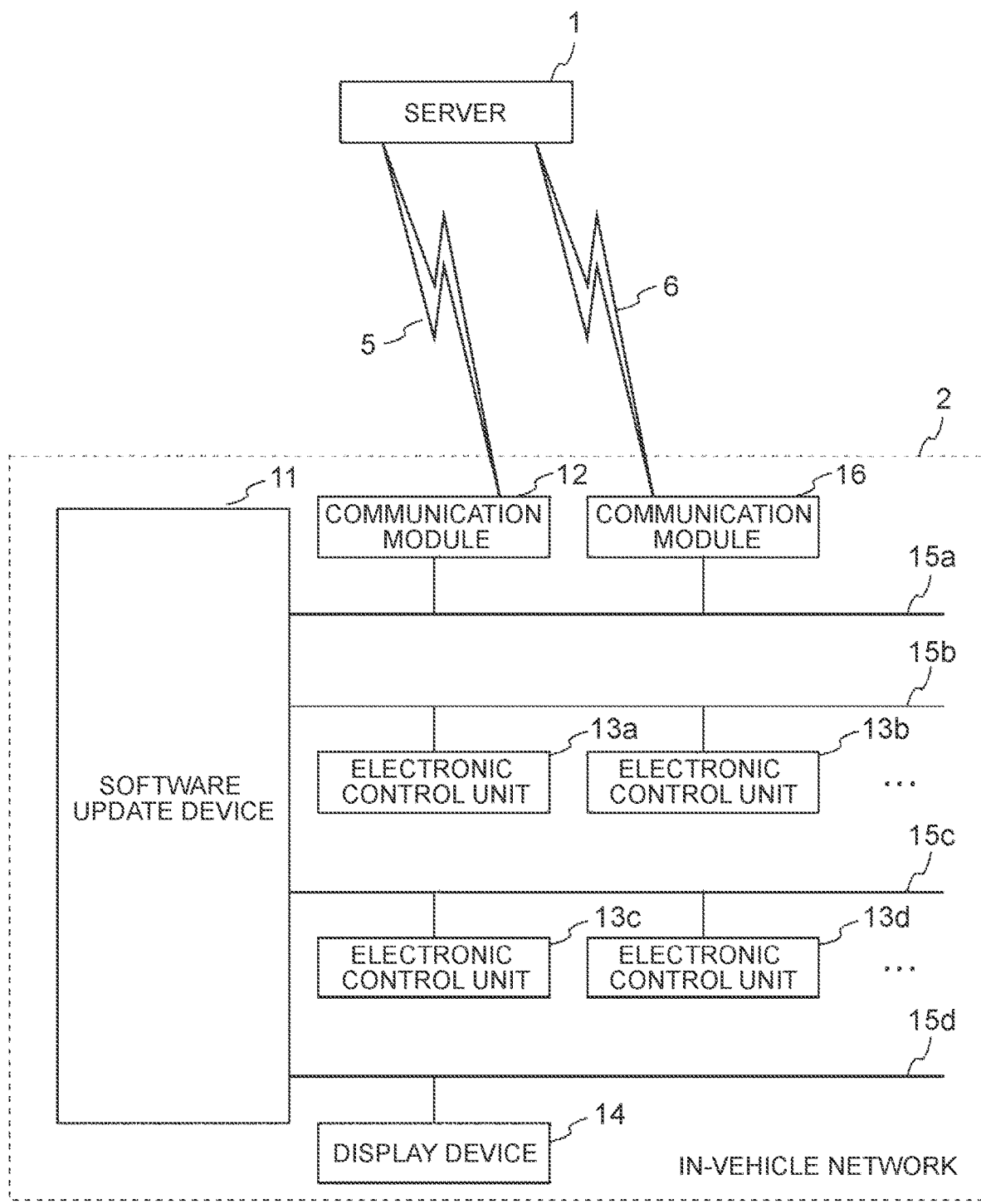
FIG. 1 is a block diagram showing an overall configuration of a network system according to an embodiment.
Figure 2:
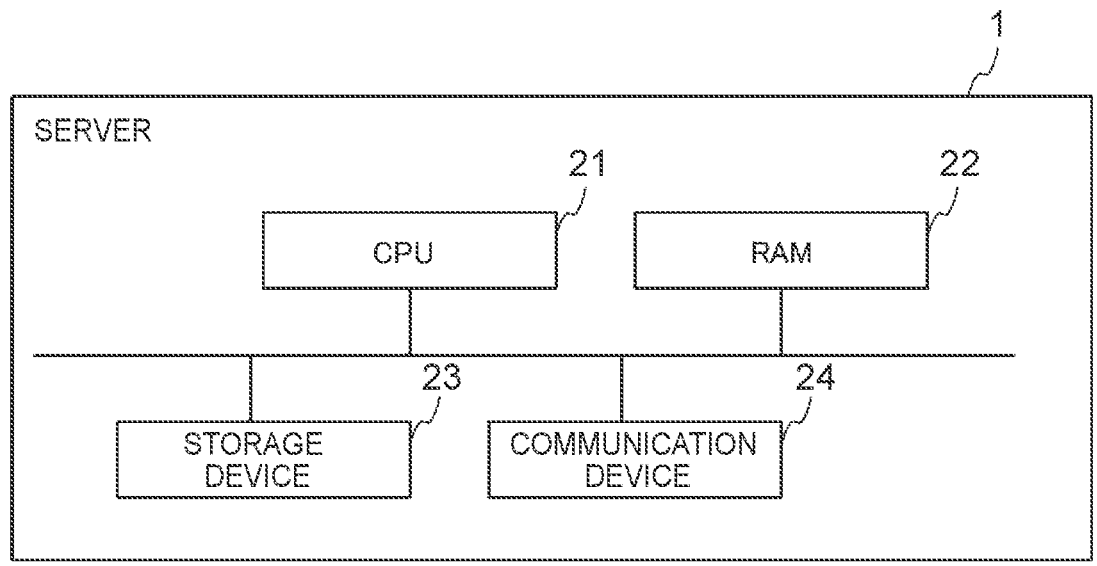
FIG. 2 is a block diagram showing a schematic configuration of a server shown in FIG. 1.
Figure 3:
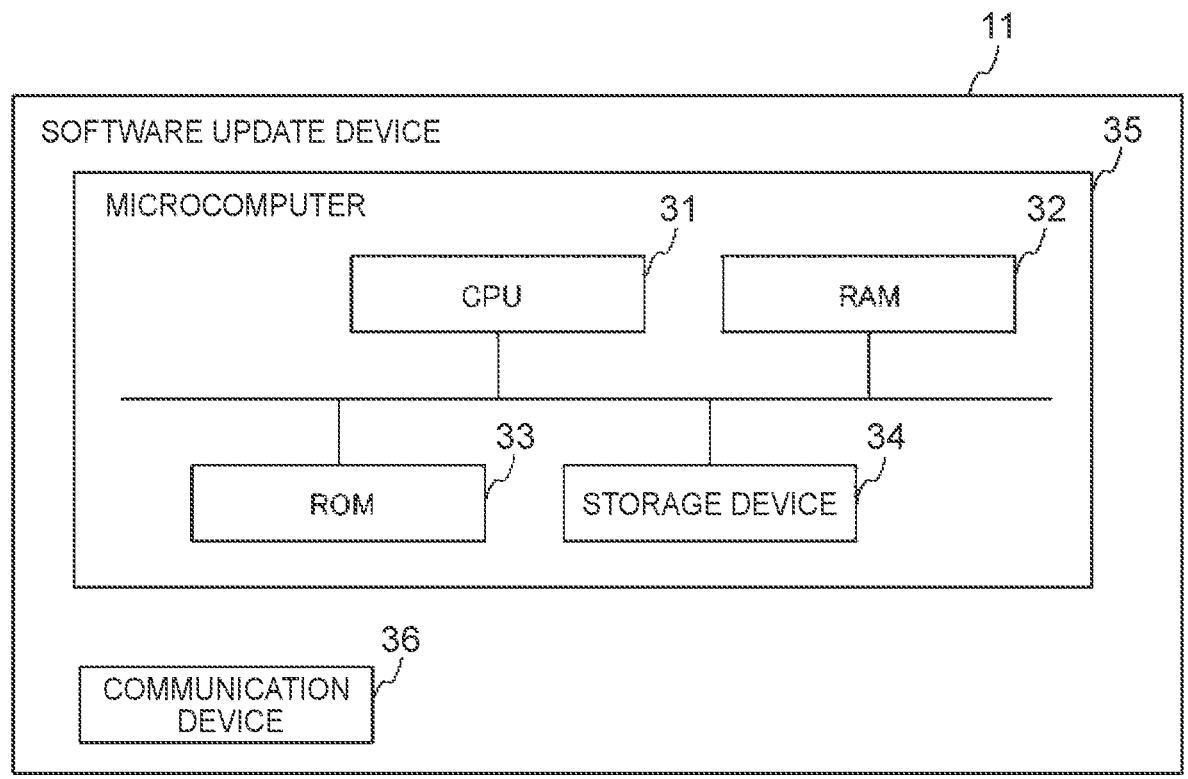
FIG. 3 is a block diagram showing a schematic configuration of a software update device shown in FIG. 1.

FIG. 1 is a block diagram showing an overall configuration of a network system according to an embodiment, FIG. 2 is a block diagram showing a schematic configuration of a server shown in FIG. 1, and FIG. 3 is a block diagram showing a schematic configuration of a software update device shown in FIG. 1.

The network system shown in FIG. 1 is a system for updating software of electronic control units 13a to 13d mounted on a vehicle, and includes a server 1 (center) and an in-vehicle network 2 mounted on the vehicle.

The server 1 is able to communicate with a software update device 11 mounted on the vehicle via a network, and manages software updates of the electronic control units 13a to 13d mounted on the vehicle. The server 1 is able to communicate with the software update device 11 using a first communication method and a second communication method. When the server 1 communicates using the first communication method, the server 1 uses a protocol or a service that enables bidirectional communication with the software update device 11. When the server 1 communicates using the second communication method, it is sufficient that the server 1 is able to communicate with at least the software update device 11 using a protocol or a service that enables transmission of data in one direction. However, even when the server 1 uses the second communication method, a protocol or a service that enables bidirectional communication with the software update device 11 may be used. The first communication method is a communication method used for transmission of various types of control information between the server 1 and the software update device 11 and transmission of update data from the server 1 to the software update device 11 when a software update process described later is performed. The second communication method is a communication method used when the server 1 provides a notification to the software update device 11 in the case where the server 1 cannot communicate with the software update device 11 by the first communication method. The first communication method and the second communication method are not particularly limited, but it is preferable to use a wireless communication method. For example, as the communication by the first communication method, communication using a mobile communication system (third generation (3G) communication, fourth generation (4G) communication, long term evolution (LTE), fifth generation (5G) communication), communication using Wi-Fi (registered trademark), and the like can be used. As the communication by the second communication method, communication using a mobile communication system, communication by a communication service such as a short message service (SMS), Bluetooth (registered trademark) Low Energy (BLE), Wi-Fi (registered trademark), charging equipment (charger), and the like can be used.

As shown in FIG. 2, the server 1 includes a central processing unit (CPU) 21, a random access memory (RAM) 22, a storage device 23, and a communication device 24. The storage device 23 includes a readable and writable storage medium such as a hard disk or a solid state drive (SSD), and stores software for executing software update management, update management information described later, and update data of the electronic control unit. In the server 1, the CPU 21 (one or more processors) executes a control process described later by executing the software read from the storage device 23 using the RAM 22 as a work area. The communication device 24 is a device that communicates with the software update device 11 via a network.

The in-vehicle network 2 includes the software update device 11 (over-the-air (OTA) master), communication modules 12 and 16, the electronic control units 13a to 13d, and a display device 14. The software update device 11 is connected to the communication modules 12 and 16 via a bus 15a, is connected to the electronic control units 13a and 13b via a bus 15b, is connected to the electronic control units 13c and 13d via a bus 15c, and is connected to the display device 14 via a bus 15d. The software update device 11 is capable of bidirectional communication with the server 1 via the communication module 12 (communication by the first communication method), and capable of at least receiving information from the server 1 via the communication module 16 (communication by the second communication method). The software update device 11 controls the software update of the electronic control unit to be updated, among the electronic control units 13a to 13d, based on the update data acquired from the server 1. The software update device 11 may also be referred to as a central gateway. The communication modules 12 and 16 are communication devices that connect the in-vehicle network 2 and the server 1 provided in the center. In the present embodiment, the communication modules 12 and 16 are provided corresponding to the first communication method and the second communication method, respectively. However, instead of the communication modules 12 and 16, one communication module capable of communication by the first communication method and communication by the second communication method may be provided. The electronic control units 13a to 13d are electronic control units (ECUs) that control operation of various parts of the vehicle, and each include a CPU, a RAM, and a non-volatile storage device such as a flash memory or an electrically erasable and programmable read-only memory (EEPROM). The CPU uses the RAM as a work area to execute the software stored in the storage device, thereby executing the control function. The display device 14 (human machine interface (HMI)) is used to display various indications such as an indication of the fact that there is update data, an indication of a request for approval for software update from the user, an indication of update results, and the like, at the time of update process of the software of the electronic control units 13a to 13d. As the display device 14, a display device of a car navigation system can be typically used, but the display device 14 is not particularly limited as long as it can display information necessary for the software update process. Although four electronic control units 13a to 13d are illustrated in FIG. 1, the number of electronic control units is not particularly limited. In addition, another electronic control unit may be further connected to the bus 15d shown in FIG. 1, besides the display device 14.

As shown in FIG. 3, the software update device 11 includes: a microcomputer 35 having a CPU 31, a RAM 32, a ROM 33, a storage device 34; and a communication device 36. In the software update device 11, the CPU 31 (one or more processors) of the microcomputer 35 executes a control process described later by executing the software read from the ROM 33 using the RAM 32 as a work area. The communication device 36 is a device that communicates with the communication modules 12 and 16, the electronic control units 13a to 13d, and the display device 14 via the buses 15a to 15d shown in FIG. 1.

Figures 4, 5:
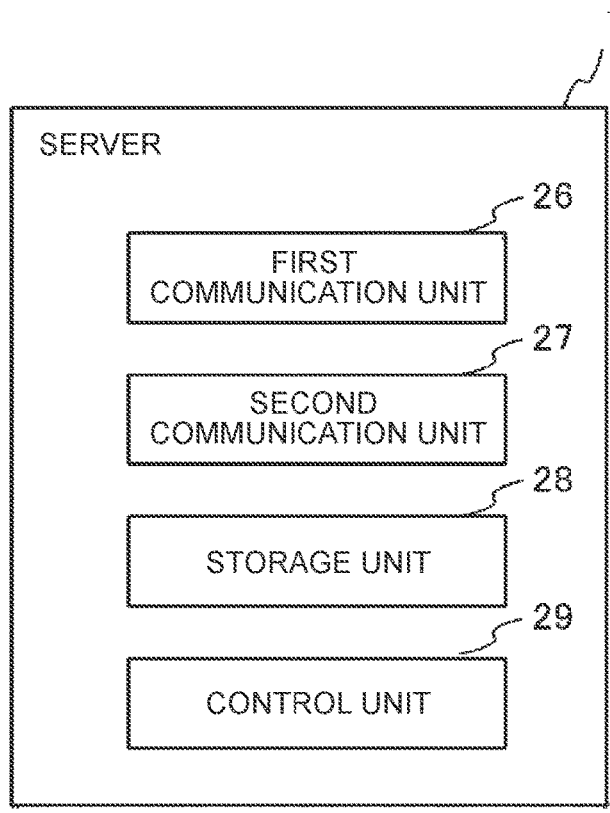
FIG. 4 is a functional block diagram of the server shown in FIG. 1.
FIG. 5 is a diagram showing an example of update management information stored in the server shown in FIG. 1.

FIG. 4 is a functional block diagram of the server shown in FIG. 1, and FIG. 5 is a diagram showing an example of update management information stored in the server shown in FIG. 1.

The server 1 includes a first communication unit 26, a second communication unit 27, a storage unit 28, and a control unit 29. The first communication unit 26, the second communication unit 27, and the control unit 29 are realized by the CPU 21 shown in FIG. 2 executing software stored in the storage device 23 using the RAM 22, and the storage unit 28 is realized by the storage device 23 shown in FIG. 2.

The first communication unit 26 performs bidirectional communication with the software update device 11 using the first communication method described above. The first communication unit 26 can receive a software update confirmation request and an update validation request from the software update device 11. The update confirmation request is, for example, information transmitted from the software update device 11 to the server 1 when power supply or ignition is turned on in the vehicle, and is information for requesting the server 1 to confirm whether there is software update data of the electronic control unit. The update validation request is information transmitted from the software update device 11 to the server 1, and is information for requesting validation of performing software update of the electronic control unit using the communication by the first communication method. When the control unit 29, which will be described later, determines that the software update of the electronic control unit of the vehicle that has transmitted the update confirmation request is necessary, the first communication unit 26 transmits the update data stored in the storage unit 28 to the software update device 11.

The second communication unit 27 performs communication with the software update device 11 using the second communication method described above. The second communication unit 27 transmits, to the software update device 11, a message requesting for transmission of the update confirmation request or the update validation request, based on the determination result of the control unit 29 described later.

The storage unit 28 stores update management information for managing the update statuses of the software of the electronic control units. As shown in FIG. 5, the update management information is information in which vehicle identification information (vehicle ID) for identifying the vehicle, validity information indicating whether the software update process using the first communication method is valid, and information indicating available software for the electronic control unit are associated with each other. In the present embodiment, a combination of the latest version information of the software of each of the electronic control units is defined as the information indicating the available software for the electronic control unit. The validity information is set by registration of the user or the dealership, and when "valid" is set as the validity information, the software of the vehicle can be updated through the communication by the first communication method. Further, in the update management information shown in FIG. 5, update date and time representing date and time that the previous software update is completed are associated with the vehicle ID for which the validity information is set to "valid" (that is, the software update through the communication by the first communication method can be performed) and stored. In the update management information shown in FIG. 5, the previous date and time that information (for example, the update confirmation request or the update validation request) is received from the software update device 11 (previous reception date and time) may be associated with the vehicle ID, in addition to the previous update date and time or instead of the previous update date and time.

In FIG. 5, an example is shown in which, as the update management information, one table in which the validity information and the version information of available software are associated with each vehicle ID is provided. However, the validity information and the version information of the available software may be provided as separate tables. When the validity information and the version information of the available software are set as separate tables, the validity information needs to be set for each vehicle ID, but the version information of the available software need not to necessarily be set for each vehicle ID. For example, the version information of the available software may be set for each vehicle type ID that identifies the vehicle type (model).

In the present embodiment, the storage unit 28 further stores the update data of the electronic control unit. However, instead of storing the update data in the storage unit 28, a distribution server for the update data may be provided separately from the server 1.

The control unit 29 determines whether the first communication unit 26 has received the update confirmation request or the update validation request from the software update device 11 through the communication by the first communication method. The determination of the control unit 29 can be performed based on, for example, a communication log of the first communication unit 26 or the update management information stored in the storage unit 28. Further, when the first communication unit 26 receives the software update confirmation request from the software update device 11, the control unit 29 determines whether the software update of the electronic control unit is necessary in the vehicle equipped with the software update device 11 that has transmitted the update confirmation request, based on the update management information stored in the storage unit 28. Further, when the first communication unit 26 receives the software update validation request from the software update device 11, the control unit 29 updates the update management information stored in the storage unit 28. Specifically, the control unit 29 sets "valid" as the validity information corresponding to the software update device 11 that has transmitted the update validation request. As a result, the software update of the electronic control unit of the vehicle equipped with the software update device 11 that has transmitted the update validation request, by the first communication method becomes valid.

Figure 6:
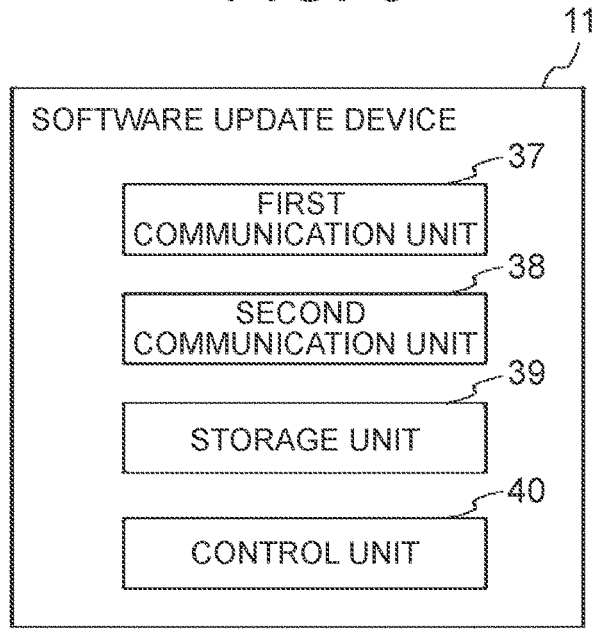
FIG. 6 is a functional block diagram of the software update device shown in FIG. 1.

FIG. 6 is a functional block diagram of the software update device shown in FIG. 1.

The software update device 11 includes a first communication unit 37, a second communication unit 38, a storage unit 39, and a control unit 40. The first communication unit 37, the second communication unit 38, and the control unit 40 are realized by the CPU 31 shown in FIG. 3 executing software stored in the ROM 33 using the RAM 32. The storage unit 39 is realized by the storage device 34 shown in FIG. 3.

The first communication unit 37 performs bidirectional communication with the server 1 using the first communication method. For example, when power supply or ignition of the vehicle is turned on, the first communication unit 37 transmits the update confirmation request for the software to the software update device 11 through the communication by the first communication method, and receives the confirmation result (information indicating whether there is update data) in the server 1 through the communication by the first communication method. The update confirmation request includes the vehicle ID for identifying the vehicle and software versions of the electronic control units 13a to 13d connected to the in-vehicle network 2. As described with reference to FIG. 5, when the server 1 manages the software version information for each vehicle type ID rather than for each vehicle ID, the first communication unit 37 transmits an update confirmation request including the vehicle type ID to the server 1. When there is update data of the software of the electronic control unit, the first communication unit 37 transmits a download request for the distribution package to the server 1 and receives the distribution package transmitted from the server 1. The distribution package may include verification data for verifying the authenticity of the update data, the number and installation order of update data, various types of control information used at the time of software update, and the like. The first communication unit 37 stores the received distribution package in the storage unit 39. The first communication unit 37 verifies the authenticity of the received update data. Further, the first communication unit 37 transmits an update validation request for validating software update of the electronic control unit through the communication by the first communication method, to the server 1 through the communication by the first communication method based on the instruction from the user.

The second communication unit 38 receives a notification transmitted from the server 1 using the second communication method. The notification is a message or the like requesting the transmission of the update confirmation request or the update validation request described above, and is transmitted from the server 1 when the communication between the first communication unit 37 and the server 1 cannot be performed using the first communication method.

The storage unit 39 stores the update data received from the server 1 by the first communication unit 37.

When the download of the distribution package by the first communication unit 37 is completed, the control unit 40 performs installation and activation for the electronic control unit to be updated. The electronic control unit to be updated can be specified based on the information included in the distribution package (identification information of the electronic control unit associated with the update data, and the like). Further, when the second communication unit 38 receives the notification from the server 1 through the communication by the second communication method, the control unit 40 causes an output device such as the display device 14 or a speaker (not shown) to output content of the notification to present the notification to the user and the like.

Here, the software update process involves a phase of downloading the update data from the server 1, a phase of transferring the downloaded update data to the electronic control unit to be updated and installing the update data in the storage area of the electronic control unit to be updated, and a phase of activation in which the updated version of the software installed in the electronic control unit to be updated is activated.

Downloading is a process of receiving and storing the update data transmitted from the server 1 for updating the software of the electronic control unit. The downloading phase includes, besides receiving the update data, control of a series of processes related to downloading, such as determination as to whether downloading can be performed and verification of the update data. Installation is a process of writing an updated version of the program (update software) in the storage unit of the electronic control unit to be updated based on the downloaded update data. The installation phase includes, in addition to execution of installation, control of a series of processes related to installation, such as determination as to whether installation can be performed, transfer of the update data, and verification of the updated version of the program. Activation is a process of activating the installed updated version of the program. The activation control includes, in addition to execution of activation, control of a series of processes related to activation, such as determination as to whether the activation can be performed and verification of the execution results.

The update data transmitted from the server 1 to the software update device 11 may include any of the update software of the electronic control unit, the compressed data obtained by compressing the update software, and the divided data obtained by dividing the update software or the compressed data. Further, the update data may include an identifier for identifying the electronic control unit to be updated (ECU ID) and an identifier for identifying the software before update (ECU software ID). The update data is downloaded as the distribution package described above, and the distribution package contains the update data of one or more electronic control units.

When the update data includes the update software itself, the software update device 11 transfers the update data (update software) to the electronic control unit to be updated during the installation phase. When the update data includes compressed data, difference data, or divided data of the update software, the software update device 11 may transfer the update data to the electronic control unit to be updated and the electronic control unit to be updated may generate the update software from the update data. Alternatively, the software update device 11 may transfer the update software to the electronic control unit to be updated after generating the update software from the update data. Here, the update software can be generated by decompressing the compressed data and assembling the difference data or the divided data.

The update software can be installed by the electronic control unit to be updated based on the installation request from the software update device 11. Alternatively, the electronic control unit to be updated that has received the update data may autonomously perform installation without receiving an explicit instruction from the software update device 11.

The update software can be activated by the electronic control unit to be updated based on the activation request from the software update device 11. Alternatively, the electronic control unit to be updated that has received the update data may autonomously perform activation without receiving an explicit instruction from the software update device 11.

The software update process can be performed continuously or in parallel for each of the electronic control units.

The "software update process" in the present specification includes not only a process of continuously performing all of the downloading, installation, and activation, but also a process of performing only a part of the downloading, installation, and activation.

Hereinafter, the control process executed by the server 1 and the software update device 11 will be described.

Figure 7:
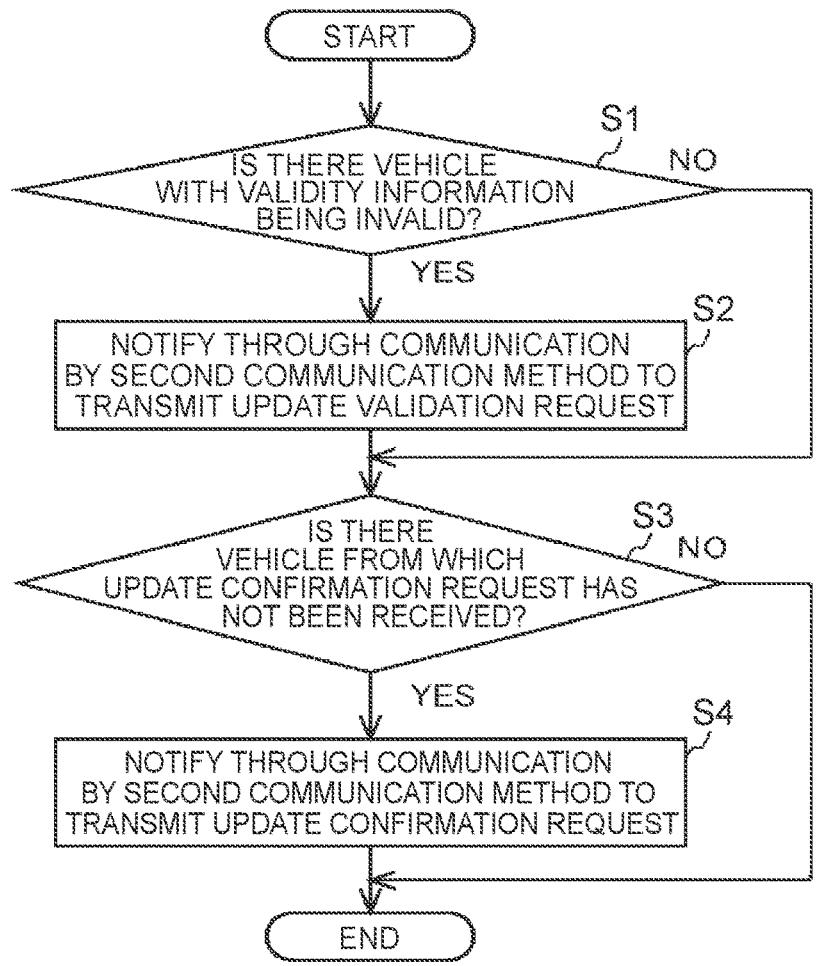
FIG. 7 is a flowchart showing an example of a control process executed by the server according to the embodiment.

FIG. 7 is a flowchart showing an example of the control process executed by the server according to the embodiment. The control process shown in FIG. 7 is a process of specifying a vehicle for which software update through the communication by the first communication method is invalid and a vehicle that does not transmit an update confirmation request to the server 1, and providing a notification to the specified vehicles through the communication by the second communication method. Thus, the server 1 periodically and repeatedly executes the control process shown in FIG. 7.

In step S1, the control unit 29 refers to the update management information stored in the storage unit 28 to determine whether there is a vehicle (vehicle ID) for which the validity information is not set to "valid". The determination in step S1 is a process of determining whether the first communication unit 26 has received the update validation request for validating the software update by OTA from each vehicle through the communication by the first communication method. When the determination in step S1 is YES, the process proceeds to step S2; otherwise, the process proceeds to step S3.

In step S2, the second communication unit 27 transmits a notification requesting the one or more vehicles specified in step S1 to transmit a software update validation request through the communication by the second communication method. Then, the process proceeds to step S3.

In step S3, the control unit 29 determines whether there is a vehicle from which the update confirmation request for confirming the presence or absence of the update data has not been received. The determination in step S3 is a process of determining whether the first communication unit 26 has received the update confirmation request through the communication by the first communication method. For example, the control unit 29 refers to the update management information stored in the storage unit 28, and based on the previous update date and time and the current date and time, determines whether there is a vehicle (vehicle ID) for which a predetermined period has elapsed since the last software update of the electronic control unit. When the previous reception date and time (the previous date and time of receiving the information from the software update device 11) are recorded in the update management information instead of the previous update date and time, the control unit 29 may determine whether there is a vehicle for which a predetermined period has elapsed since the previous reception of information based on the previous reception date and time and the current date and time. When the previous reception date and time are recorded in the update management information together with the previous update date and time, the determination in step S3 may be performed based on either the elapsed time from the previous update date and time or the elapsed time from the previous reception date and time. As another example, the determination in step S3 may be performed based on whether a predetermined time has elapsed since the update data of the electronic control unit was released (since the software update campaign was announced). When the determination in step S3 is YES, the process proceeds to step S4; otherwise, the process ends.

In step S4, the second communication unit 27 transmits a notification requesting the one or more vehicles specified in step S3 to transmit a software update confirmation request through the communication by the second communication method. Then, the process ends.

Figure 8:
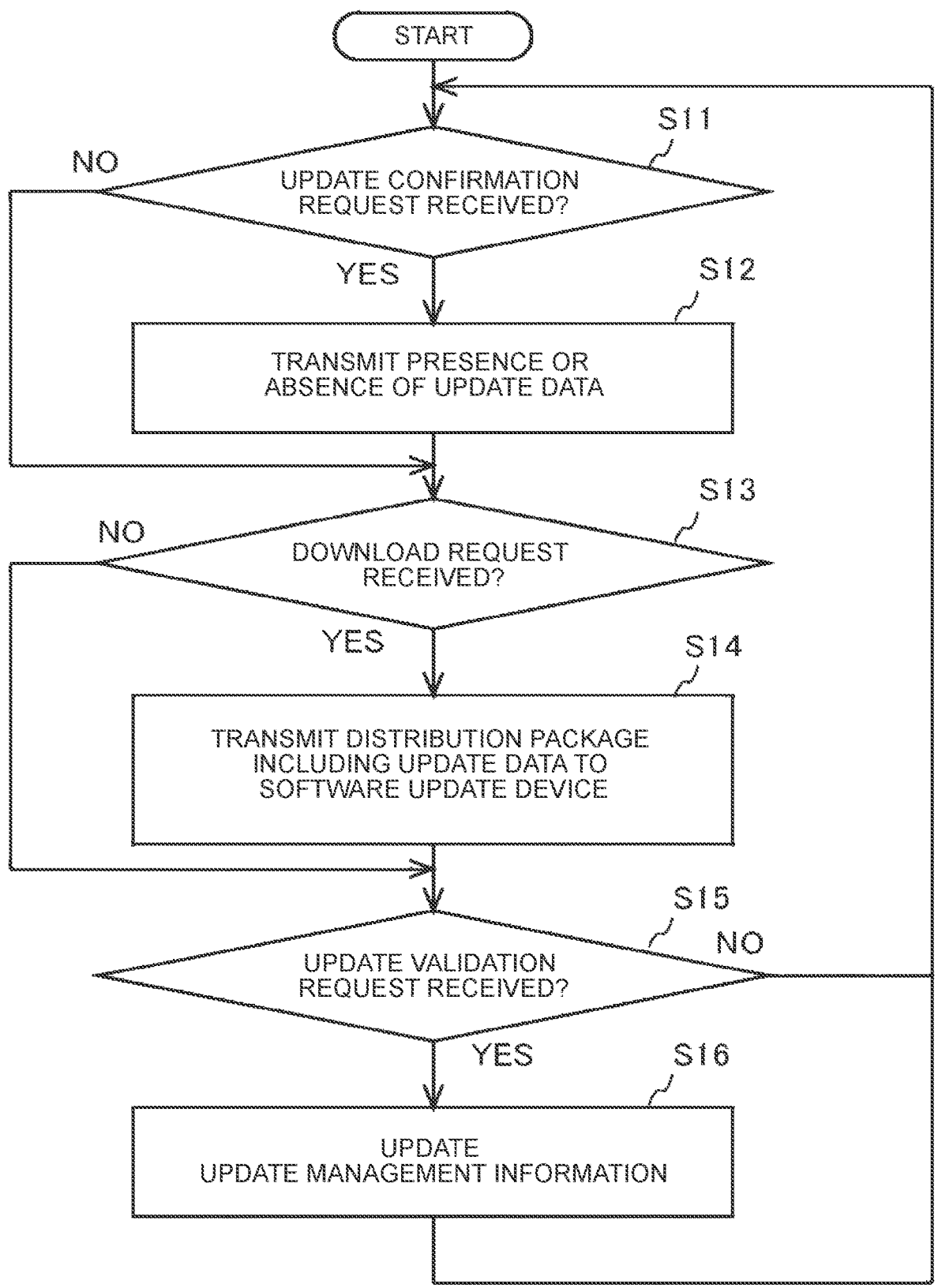
FIG. 8 is a flowchart showing another example of the control process executed by the server according to the embodiment.

FIG. 8 is a flowchart showing another example of the control process executed by the server according to the embodiment. The control process shown in FIG. 8 is a process executed when the server 1 receives an update confirmation request or an update validation request from the software update device 11 through the communication by the first communication method. The control process shown in FIG. 8 is repeatedly executed, for example, at predetermined time intervals.

In step S11, the first communication unit 26 determines whether the update confirmation request has been received from the software update device 11. When the determination in step S11 is YES, the process proceeds to step S12; otherwise, the process proceeds to step S13.

In step S12, the first communication unit 26 transmits information indicating whether there is update data of the software of the electronic control unit to the vehicle that has transmitted the update confirmation request. It can be determined that there is update data, for example, when the control unit 29 refers to the update management information stored in the storage unit 28 and compares the combination of software versions associated with the vehicle ID included in the update confirmation request and stored in the update management information, with the combination of the current software versions included in the update confirmation request, and the combination of the current versions included in the update confirmation request is older than the combination of the versions stored in the update management information. Then, the process proceeds to step S13.

In step S13, the first communication unit 26 determines whether the download request for the distribution package has been received from the software update device 11. When the determination in step S13 is YES, the process proceeds to step S14; otherwise, the process proceeds to step S15.

In step S14, the first communication unit 26 generates a distribution package including update data for updating the software of the vehicle that has transmitted the download request, and transmits the generated distribution package to the software update device 11. Then, the process proceeds to step S15.

In step S15, the control unit 29 determines whether the update validation request has been received from the software update device 11. When the determination in step S15 is YES, the process proceeds to step S16; otherwise, the process proceeds to step S11.

In step S16, the control unit 29 updates the validity information corresponding to the vehicle ID specified in the update validation request to "valid". Then, the process proceeds to step S11.

Figure 9:
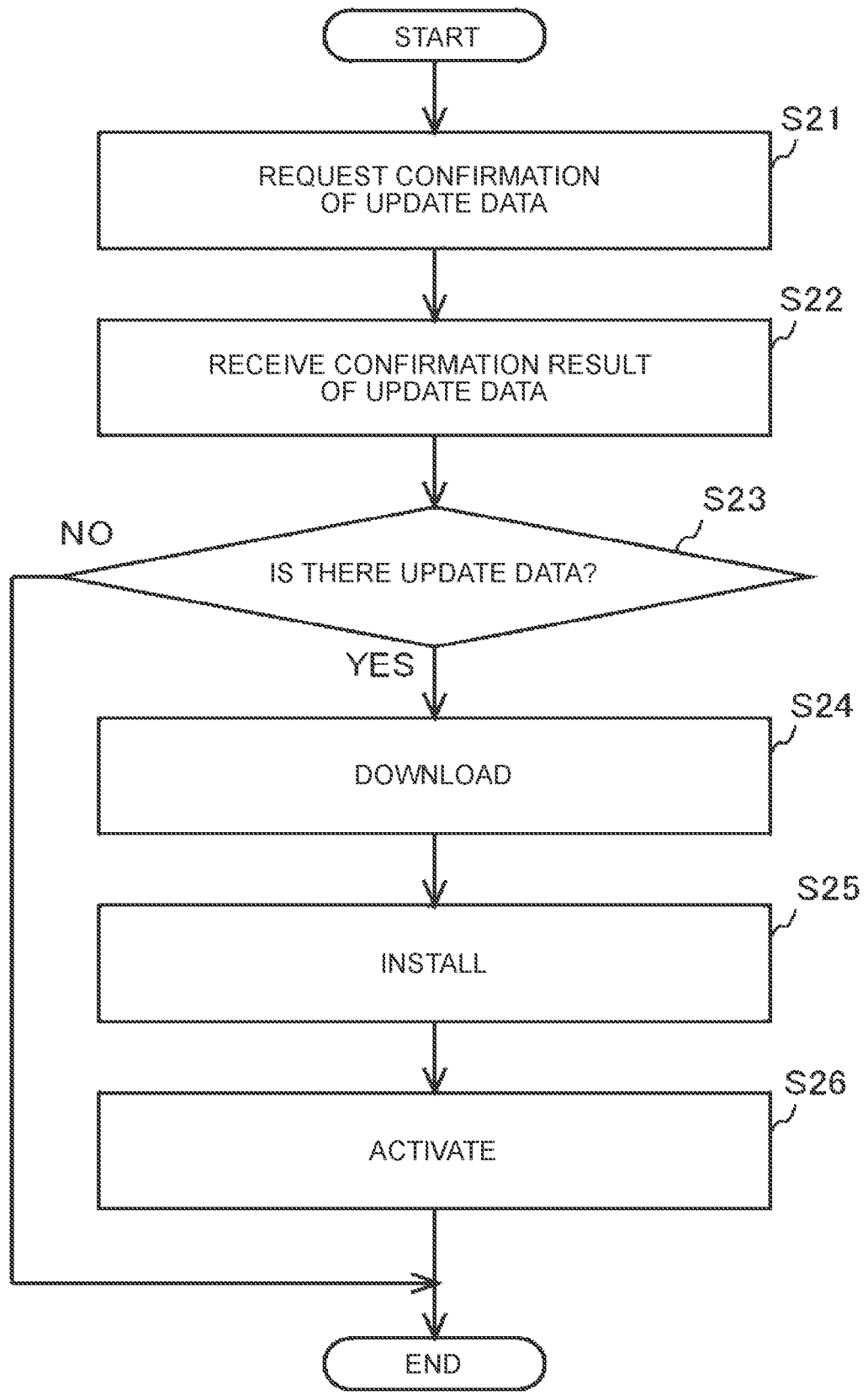
FIG. 9 is a flowchart showing an example of the control process executed by the software update device according to the embodiment.

FIG. 9 is a flowchart showing an example of the control process executed by the software update device according to the embodiment. FIG. 9 shows an outline of the software update process executed by the software update device 11. The control process in FIG. 9 is executed, for example, when power supply or ignition of the vehicle is turned on.

In step S21, the first communication unit 37 transmits an update confirmation request including the vehicle ID and the combination of the software versions of the electronic control units 13a to 13d to the server 1 through the communication by the first communication method. Then, the process proceeds to step S22.

The first communication unit 37 receives the confirmation result from the server 1. Then, the process proceeds to step S23.

In step S23, the control unit 40 determines whether there is software update data of the electronic control units 13a to 13d based on the confirmation result received from the server 1. When the determination in step S23 is YES, the process proceeds to step S24; otherwise, the process ends.

In step S24, the first communication unit 37 executes the download process. More specifically, the first communication unit 37 transmits a download request for the distribution package to the server 1, receives the distribution package transmitted in response to the download request, and stores the received distribution package in the storage unit 39. The first communication unit 37 verifies the authenticity of the update data included in the received distribution package. In step S24, it may be determined whether the download can be performed, and completion of downloading may be notified to the server 1. Then, the process proceeds to step S25.

In step S25, the control unit 40 executes the installation process for the electronic control unit to be updated. The installation process of step S25 includes determination of whether the installation can be performed, a process of requesting the user for approval to the installation and accepting the input of the approval, transfer of the update data from the software update device 11 to the electronic control unit to be updated, installation request to the electronic control unit to be updated, verification request of installation to the electronic control unit to be updated, and the like. The electronic control unit to be updated installs the updated version of the software in the storage area using the update data received from the software update device 11. Then, the process proceeds to step S26.

In step S26, the control unit 40 executes an activation process for the electronic control unit to be updated. The activation process in step S26 includes determination of whether the activation can be performed, a process of requesting the user for approval to the activation and accepting the input of the approval, an activation request to the electronic control unit to be updated, and the like. The electronic control unit to be updated activates and starts the updated version of the software by switching the software to be executed to the updated version of the software. Then, the process ends.

Figure 10:
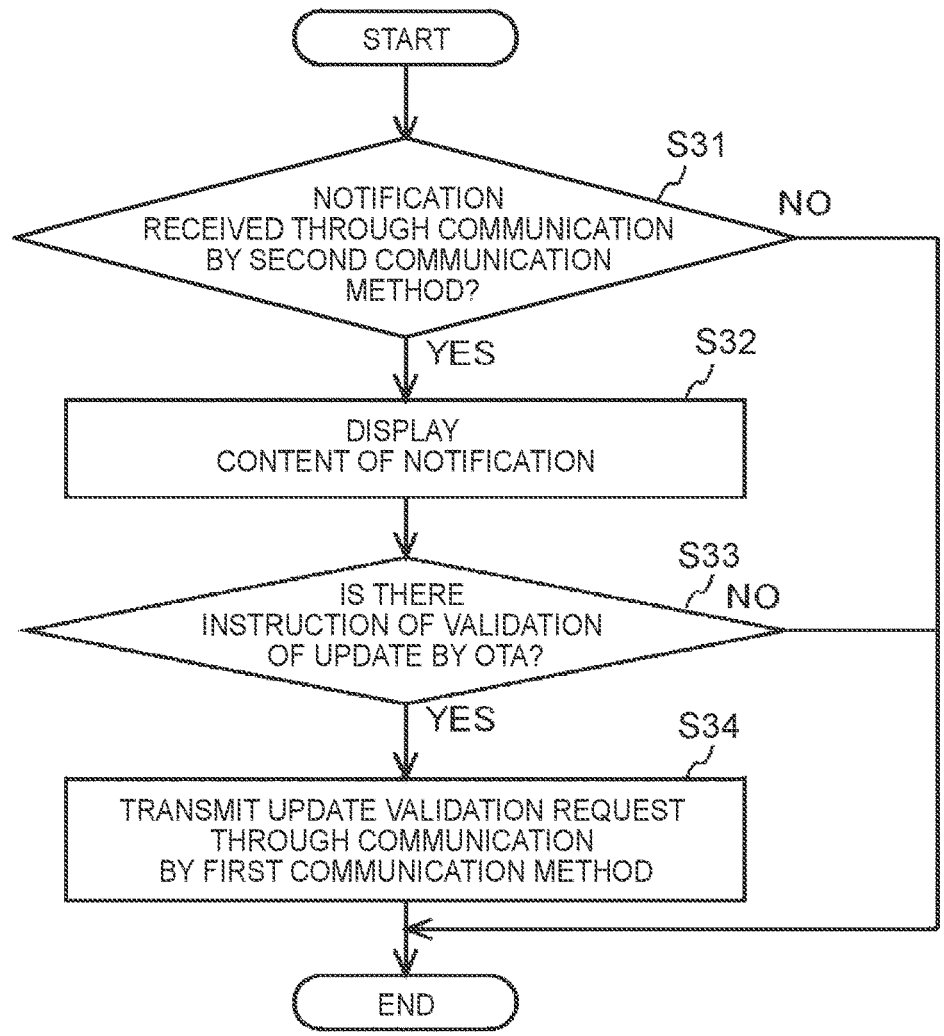
FIG. 10 is a flowchart showing another example of the control process executed by the software update device according to the embodiment.

FIG. 10 is a flowchart showing another example of the control process executed by the software update device according to the embodiment. The control process shown in FIG. 10 is a process executed by the software update device 11 when the software update device 11 receives a notification from the server 1 through the communication by the second communication method.

In step S31, the control unit 40 determines whether the second communication unit 38 has received the notification from the server 1 through the communication by the second communication method. When the determination in step S31 is YES, the process proceeds to step S32; otherwise, the process ends.

In step S32, the control unit 40 displays the notification received by the second communication unit 38 on the display device 14. Specifically, when the notification received in step S31 requests the transmission of the update confirmation request, it is assumed that a situation in which the vehicle is not able to communicate with the server 1 by the first communication method continues for a predetermined period. In this case, the display device 14 may display a message to prompt an operation that triggers the transmission of the update confirmation request (for example, an operation of turning on the power supply or ignition of the vehicle) in a place under a good communication environment in order to confirm the software update. When the notification received in step S32 requests the transmission of the update validation request, which means that registration to validate the software update by OTA using the communication by the first communication method has not been performed, a message prompting the validation of software update by OTA may be displayed on the display device 14. In step S32, instead of causing the display device 14 to display the information related to the notification received by the second communication unit 38, the control unit 40 may cause the output device such as a speaker to output the information by audio. Then, the process proceeds to step S33.

In step S33, the control unit 40 determines whether an instruction requesting the server 1 to validate the software update by OTA has been input. The determination in step S33 can be performed based on whether a specific operation on the input device provided in the vehicle is performed in response to the message displayed in step S32 and prompting the validation of the software update by OTA, for example. When the determination in step S33 is YES, the process proceeds to step S34; otherwise, the process ends.

In step S34, the first communication unit 37 transmits an update validation request requesting validation of the software update by OTA to the server 1. Then, the process ends.

In step S32, when the user performs the specific operation after the message prompting the specific operation that triggers the transmission of the update confirmation request (for example, an operation of turning on the power supply or ignition of the vehicle) is displayed, the software update device 11 executes the control process shown in FIG. 9.

As described above, the server 1 according to the present embodiment has the first communication unit 26 capable of bidirectional communication with the software update device 11 using the first communication method and the second communication unit 27 capable of transmitting information to the software update device 11 using the second communication method. When the server 1 does not receive a specific request (update confirmation request or update validation request) from the software update device 11 through the communication by the first communication method, the server 1 can provide a notification to the software update device 11 through the communication by the second communication method, thereby requesting transmission of the specific request. In this way, the server 1 is able to notify the software update device that the specific request related to the software update process is not transmitted, using the second communication method different from the first communication method. Therefore, when the software update device 11 is not able to transmit the information to the server 1, the server 1 is able to notify the vehicle that there is update data of the software of the electronic control unit and that it is necessary to validate the software update by OTA.

Further, when the server 1 receives the update validation request, the server 1 can validate the software update of the electronic control unit by OTA by updating the validity information included in the update management information.

Further, when the server 1 receives the update confirmation request and it is necessary to update the software of the electronic control unit, the server 1 can transmit the update data stored in the storage unit to the software update device to execute the software update process.

Modification

In the above embodiment, the software update device 11 may further manage the validity state of software update by OTA. Specifically, the storage unit 39 of the software update device 11 stores validity information indicating whether the software update of the electronic control unit using the communication by the first communication method is valid. If the validity information does not indicate "valid", the software update device 11 cannot perform the software update of the electronic control unit by OTA, and for example, cannot transmit the update confirmation request of step S21 shown in FIG. 9 to the server 1. When the validity information stored in the storage unit 39 is updated to "valid", the first communication unit 37 transmits, to server 1, the update validation request requesting the validation of the software update by OTA, using the communication by the first communication method.

Figure 11:
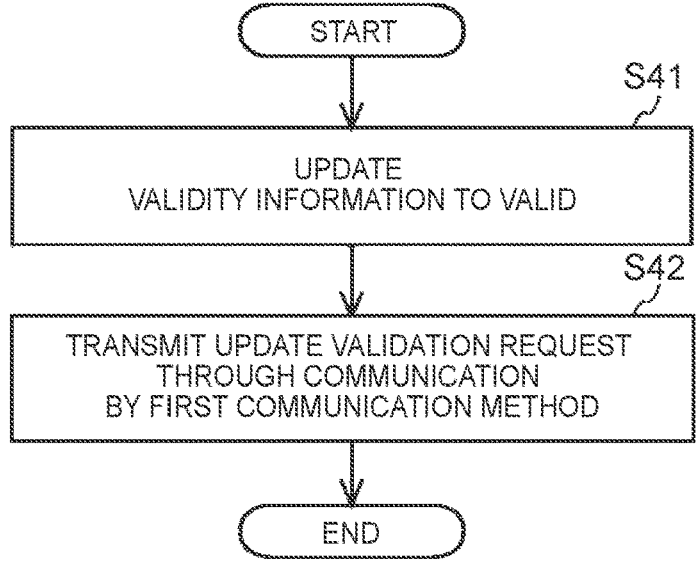
FIG. 11 is a flowchart showing an example of the control process executed by the software update device according to a modification.

FIG. 11 is a flowchart showing an example of the control process executed by the software update device according a modification. The control process shown in FIG. 11 is a process that is started when an instruction requesting the server 1 to validate software update by OTA is input, and can be executed separately from the control process shown in FIG. 10.

In step S41, the control unit 40 updates the validity information stored in the storage unit 39 to "valid". Then, the process proceeds to step S42.

In step S42, the first communication unit 37 transmits an update validation request requesting validation of the software update by OTA to the server 1. Then, the process ends.

In the modification, the control process executed by the server 1 is the same as that described with reference to FIG. 8. When the server 1 receives the update validation request transmitted in step S42, the server 1 updates the validity information corresponding to the vehicle that transmitted the update validation request (validity information included in the update management information) to "valid". This enables the subsequent software update of the electronic control unit by OTA.

In the modification, the software update device 11 has the validity information indicating the validity state of the software update by OTA. The software update device 11 can transmit the update validation request to the server 1 when the validity information is updated to "valid".

Other Modifications

The function of the server 1 exemplified as the embodiment can be realized as an update management method executed by a computer including a processor (CPU), a memory, and a storage device, an update management program executed by the computer, or a computer readable non-transitory storage medium that stores the update management program. Similarly, the function of the software update device 11 exemplified as the embodiment can be realized as an update control method executed by an in-vehicle computer including a processor (CPU), a memory, and a storage device, an update control program executed by the in-vehicle computer, or a computer readable non-transitory storage medium that stores the update control program.

In the above embodiment, an example in which the software update device 11 provided in the in-vehicle network controls the software update of all the electronic control units 13*a* to 13*d* as the master device has been described. However, any one of the electronic control units 13*a* to 13*d* may have the update control function shown in FIGS. 9 and 10 and control software updates of the other electronic control units, instead of providing the software update device 11. Further, instead of providing the software update device 11, the update control function shown in FIGS. 9 and 10 can be provided in an external device that can be connected to the in-vehicle network 2 by wire, to perform the software update process of the electronic control units 13*a* to 13*d* using the external device.

The disclosed technology can be used in a network system for updating software of an electronic control unit.

What is claimed is:

1. A server configured to communicate with a software update device that is configured to control software update of an electronic control unit mounted on a vehicle, the server comprising:
one or more processors configured to:
perform bidirectional communication with the software update device using a first communication method;
transmit information to the software update device using a second communication method different from the first communication method; and
determine whether the one or more processors have received specific information from the software update device using the first communication method, wherein
the one or more processors are configured to provide a notification to the software update device using the second communication method when determining that the one or more processors have not received the specific information from the software update device, the notification requesting the software update device to transmit, using the first communication method, the specific information.

2. The server according to claim 1, wherein the specific information is an update validation request for requesting validation of the software update of the electronic control unit through communication by the first communication method.

3. The server according to claim 2, wherein the notification includes a notification requesting the software update device to transmit the update validation request.

4. The server according to claim 2, further comprising:
a storage device that stores update management information in which vehicle identification information that identifies the vehicle and validity information indicating whether the software update through the communication by the first communication method is valid are associated with each other,
wherein the one or more processors are configured, when the one or more processors receive the update validation request from the software update device as the specific information, to set, as the validity information corresponding to the software update device that transmitted the update validation request, information indicating that the software update through the communication by the first communication method is valid.

5. The server according to claim 1, wherein the specific information is an update confirmation request for confirming whether there is update data of software of the electronic control unit through communication by the first communication method.

6. The server according to claim 5, wherein the notification includes a notification requesting the software update device to transmit the update confirmation request.

7. An update management method that is executed by a computer including a processor, a memory, and a storage device, the computer being configured to perform bidirectional communication with a software update device that controls software update of an electronic control unit mounted on a vehicle using a first communication method, and being configured to transmit information to the software update device using a second communication method different from the first communication method, the update management method comprising:
determining whether specific information has been received from the software update device using the first communication method; and
providing a notification to the software update device using the second communication method, when the computer determines that the specific information has not been received from the software update device, the notification requesting the software update device to transmit, using the first communication method, the specific information.

8. A non-transitory storage medium storing an update management program that is executable by a processor of a computer and that causes the processor to perform functions, the computer including the processor, a memory, and the non-transitory storage medium, the computer being configured to perform bidirectional communication with a software update device that controls software update of an electronic control unit using a first communication method, and being configured to transmit information to the software update device using a second communication method different from the first communication method, the functions comprising:
determining whether specific information has been received from the software update device using the first communication method; and
providing a notification to the software update device using the second communication method, when the computer determines that the specific information has not been received from the software update device, the notification requesting the software update device to transmit, using the first communication method, the specific information.

9. A software update device configured to control software update of an electronic control unit mounted on a vehicle, the software update device comprising:
one or more processors configured to:
perform bidirectional communication with a server using a first communication method;
receive information from the server using a second communication method different from the first communication method; and
determine whether the one or more processors have received a notification from the server using the second communication method, wherein
the one or more processors are configured, when determining that the one or more processors have received the notification from the server, to cause an output device to output information related to the notification that is received, and
the one or more processors are configured, when determining that the one or more processors have received the notification from the server, to transmit specific information to the server using the first communication method.

10. The software update device according to claim 9, further comprising:
a storage device that stores validity information indicating whether software update of the electronic control unit using communication by the first communication method is valid,
wherein the one or more processors are configured, when the validity information stored in the storage device is updated to information indicating that the software update is valid, to transmit, by using the first communication method, to the server an update validation request for requesting validation of the software update of the electronic control unit using the communication by the first communication method.

11. A system comprising:
a server; and
a software update device configured to control software update of an electronic control unit mounted on a vehicle, wherein
the server includes one or more first processors configured to:
  perform bidirectional communication with the software update device using a first communication method,
  transmit information to the software update device using a second communication method different from the first communication method,
  determine whether the one or more first processors have received specific information from the software update device using the first communication method, and
  provide a notification to the software update device using the second communication method when determining that the one or more first processors have not received the specific information from the software update device, the notification requesting the software update device to transmit, using the first communication method, the specific information, and
the software update device includes one or more second processors configured to:
  perform bidirectional communication with the server using the first communication method,
  receive information from the server using the second communication method,
  determine whether the one or more second processors have received the notification from the server using the second communication method, and
  when determining that the one or more second processors have received the notification from the server, cause an output device to output information related to the notification that is received.

* * * * *